United States Patent
Dodoro et al.

(10) Patent No.: US 8,038,352 B2
(45) Date of Patent: Oct. 18, 2011

(54) ROLLING BEARING DEVICE (75) Inventors: Hirofumi Dodoro, Kashihara (JP); Komatsugu Nishimura, Toyota (JP); Ikuo Ito, Toyota (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 656 days.

(21) Appl. No.: 12/010,423

(22) Filed: Jan. 24, 2008

(65) Prior Publication Data

US 2008/0253710 A1 Oct. 16, 2008

(30) Foreign Application Priority Data

Jan. 26, 2007 (JP) ................ 2007-016481

(51) Int. Cl.
*F16C 27/06* (2006.01)
*F16C 35/077* (2006.01)

(52) U.S. Cl. ......... 384/536; 548/535; 548/548; 548/582

(58) Field of Classification Search .......... 384/536–537, 384/543, 548, 581–582, 585, 467, 535; 29/898.07; 277/572; 188/266, 378; 267/152

See application file for complete search history.

(56) References Cited

U.S. PATENT DOCUMENTS

| | | | | |
|---|---|---|---|---|
| 2,532,327 A * | 12/1950 | Parks | ........................... | 384/581 |
| 2,674,505 A * | 4/1954 | Pfenninger, Jr. et al. | ..... | 384/536 |
| 2,733,108 A * | 1/1956 | Cowles | ......................... | 384/582 |
| 3,301,612 A * | 1/1967 | Thomas | ........................ | 384/536 |
| 3,704,922 A * | 12/1972 | Kleinschmidt et al. | ....... | 384/582 |
| 3,743,059 A * | 7/1973 | Morse et al. | .................. | 384/536 |
| 4,128,281 A * | 12/1978 | Batkiewicz | .................... | 384/536 |
| 4,496,252 A * | 1/1985 | Horler et al. | .................. | 384/215 |
| 4,688,952 A * | 8/1987 | Setele | ......................... | 384/537 |
| 5,044,784 A * | 9/1991 | Lisowsky | ...................... | 384/536 |
| 5,062,721 A * | 11/1991 | Chiba | ........................... | 384/585 |
| 5,214,549 A * | 5/1993 | Baker et al. | ................. | 360/97.02 |
| 5,370,404 A * | 12/1994 | Klein et al. | .................... | 277/572 |
| 5,816,712 A * | 10/1998 | Brown et al. | ................. | 384/536 |
| 5,868,503 A * | 2/1999 | Bade | .............................. | 384/536 |
| 6,007,252 A * | 12/1999 | Thelen et al. | ................. | 384/535 |
| 6,030,128 A * | 2/2000 | Pontzer | ........................ | 384/476 |
| 6,809,898 B1 * | 10/2004 | Prochazka | .................... | 384/536 |
| 6,966,701 B2 * | 11/2005 | Schelbert | ...................... | 384/476 |
| 7,431,504 B1 * | 10/2008 | Pelfrey | ......................... | 384/581 |
| 7,488,111 B2 * | 2/2009 | Chen et al. | .................... | 384/582 |
| 2005/0238513 A1 * | 10/2005 | Mueller | ......................... | 417/437 |
| 2007/0012535 A1 * | 1/2007 | Matheny | ....................... | 188/378 |

FOREIGN PATENT DOCUMENTS

JP 62-184213 11/1987

(Continued)

Primary Examiner — Marcus Charles
(74) Attorney, Agent, or Firm — McGinn IP Law Group, PLLC (57) ABSTRACT

The rolling bearing includes an inner ring, and an outer ring which is arranged in a concave part which is formed in a fixing member so as not to rotate in a state preloaded in an axial direction toward the inner ring by way of a rolling element, with the fixing member at a bottom surface of the concave part. Moreover, a vibration isolating part formed of a laminated body including a pair of metal layers and a resin layer which is thinner than these metal layers and interposed between them is press clamped to be disposed between an end surface of the outer ring at a preloaded side in the axial direction and the bottom surface of the concave part, in such a manner that a direction of lamination may coincide with the axial direction.

12 Claims, 8 Drawing Sheets

FOREIGN PATENT DOCUMENTS

| | | |
|---|---|---|
| JP | 5-57503 | 7/1993 |
| JP | 7-145814 | 6/1995 |
| JP | 8-93759 | 4/1996 |
| JP | 09112549 A * | 5/1997 |
| JP | 2004-108539 | 4/2004 |
| JP | 2004-183718 | 7/2004 |

* cited by examiner

ROLLING BEARING DEVICE

BACKGROUND OF THE INVENTION

Field of the Invention

The present invention relates to a rolling bearing device.

In recent years, developments for improving quietness of an automobile have been promoted. Among the developments, to decrease gear noise in a transmission is a matter to be developed which is particularly regarded as important. The gear noise in the transmission occurs, when vibration is generated at an engaged position of the gear, and the generated vibration passes through a shaft and a bearing to resonate with a housing or surrounding members.

In order to solve this problem, an art of fitting a vibration isolating shim or a vibration isolating cover formed of resin or metal to an outer peripheral surface of the bearing has been known (JP-A-H07-145814 and JP-A-2004-108539, for example). Because the vibration transmitted from the bearing to the housing or the surrounding members is moderated by the vibration isolating shim or the vibration isolating cover, it is possible to decrease the gear noise.

The vibration isolating shim and the vibration isolating cover employing resin have high vibration damping performance, but there is such a problem that they have poor rigidity and are likely to be deformed when they are used at high temperature. For this reason, the bearing is unable to be firmly fixed, and engaging accuracy of the gears is liable to be deteriorated. Particularly, in case of the bearing to be preloaded for use, such as a taper roller bearing and an angular ball bearing, the vibration isolating shim or the vibration isolating cover is pressurized, and so, lack of rigidity and deformation become a particular problem. There is another problem that in the vibration isolating shim or the vibration isolating cover formed of resin, resin material is deteriorated when oil has intruded.

On the other hand, the vibration isolating shim and the vibration isolating cover formed of metal have high rigidity, and are rarely deformed at high temperature. However, there is such a problem that they are inferior in vibration damping performance, as compared with the vibration isolating shim and cover formed of resin.

SUMMARY OF THE INVENTION

An object of the invention is to provide a rolling bearing device provided with a vibration isolating member which is excellent in vibration damping performance and rigidity, and in which deterioration due to intrusion of oil or the like is unlikely to occur.

In order to solve the above described problems, there is provided according to the invention, a rolling bearing device characterized by comprising an inner ring having a raceway surface for a rolling element formed on its outer peripheral surface, an outer ring having a raceway surface for the rolling element formed on its inner peripheral surface, the outer ring being engaged with a fixing member to be fixed thereto, and a vibration isolating member formed of a laminated body including a pair of metal layers and a resin layer interposed between the metal layers, the vibration isolating member being disposed between the fixing member and the outer ring.

In case where the vibration isolating member is completely formed of resin, the vibration isolating member is excellent in vibration damping performance, but has low rigidity, which leads to a problem of deformation or so when used at high temperature. On the other hand, in case where the vibration isolating member is completely formed of metal (for example, a vibration damping alloy such as Cu—Mn, Ni—Ti), the vibration isolating member has high rigidity, but there is a problem that it is inferior in the vibration damping performance, as compared with the vibration isolating member formed of resin. However, by using the laminated body having a pair of the metal layers and the resin layer interposed between the metal layers, it is possible to obtain the vibration isolating part which is excellent in both the rigidity and the vibration damping performance. In this case, by making thickness of the resin layer smaller than thickness of the metal layers, an amount of deformation when a pressure is applied can be depressed to least.

Moreover, the rolling bearing device according to the invention may have such a structure that the vibration isolating member has a vibration isolating part which is press clamped between an end surface of the outer ring at a preloaded side in an axial direction and a bottom surface of a concave part formed in the fixing member, in such a manner that a direction of lamination may coincide with the axial direction.

According to the rolling bearing device in the above described invention, the outer ring is arranged in the concave part formed in the fixing member so as not to rotate. The outer ring is preloaded with the fixing member in the axial direction toward the inner ring by way of the rolling element. Then, the inner ring is driven to rotate in the preloaded state. Vibration which has been generated with this rotation is transmitted to the rotation shaft and the rolling bearing, causing the fixing member to resonate. Therefore, in this invention, the vibration isolating part is provided between the end surface of the outer ring at the preloaded side in the axial direction and the bottom surface of the concave part thereby to absorb the vibration. This vibration isolating part has high rigidity and excellent vibration absorbing performance, because it is formed of the laminated body including a pair of the metal layers and the resin layer having smaller thickness than the metal layers and interposed between them.

Moreover, because the outer ring is preloaded as described above, the vibration isolating part is used in a pressurized state. The vibration isolating part in this invention is unlikely to be deformed even though it is pressurized, and therefore, particularly advantageous when used in the bearing which must be preloaded. A taper roller bearing or an angular ball bearing, for example, may be used as the bearing which must be preloaded.

Further, the invention can be formed as the taper roller bearing for supporting the main rotation shaft in the inner ring, in a gear driven transmission unit in which rotation from another shaft is transmitted to the main rotation shaft both in normal and reverse direction by way of a helical gear. Moreover, according to the invention, the resin layer can be made thinner than the metal layers. In this case, an amount of deformation can be depressed to least, and therefore, engaging accuracy of the helical gear can be easily secured.

Still further, according to the invention, it is preferable that an auxiliary vibration isolating part is arranged between an inner peripheral surface of the concave part in the fixing member and an outer peripheral surface of the outer ring, in such a manner that a direction of lamination may coincide with a radial direction of the outer ring. In this manner, it is possible to absorb the vibration transmitted from the end surface of the outer ring at the preloaded side in the axial direction, and at the same time, it is possible to decrease the vibration transmitted from the outer peripheral surface.

In this case, it is preferable that the outer ring is press-fitted into the concave part in the fixing member interposing the auxiliary vibration isolating part. Because the outer ring is press-fitted into the concave part, it is possible to firmly fix the outer ring. Even in case where the outer ring is press-fitted, an amount of deformation is small and a problem of axial contortion rarely occurs, because the auxiliary vibration isolating part is formed of the aforesaid laminated body.

Still further, it is preferable that the vibration isolating member is in a form of a vibration isolating sleeve in which the vibration isolating part including a pair of the metal layers and the resin layer is integrally coupled to the auxiliary vibration isolating part including a pair of the metal layers and the resin layer, in an L-shape. By integrating the vibration isolating part and the auxiliary vibration isolating part in this manner, they can be more easily assembled to the outer ring, as compared with a case in which they are provided as separate members.

For example, the vibration isolating sleeve can be formed by bending radially a ring-like laminated body including a pair of metal layers and a resin layer which is thinner than the metal layers and interposed between the metal layers, so that an inner peripheral edge portion of the ring-like laminated body may become the vibration isolating part, and an outer peripheral edge portion thereof may become the auxiliary vibration isolating part. Because the vibration isolating sleeve in this invention is excellent in workability, it can be easily worked into the above described shape.

Still further, resin layer sealed parts in which a pair of the metal layers are directly brought into tight contact with each other for the purpose of sealing the resin layer can be respectively formed in a circumferential direction, at an inner peripheral edge part of the vibration isolating part in the radial direction and at an end edge part of the auxiliary vibration isolating part at a side not connected to the vibration isolating part in the axial direction. Because the resin layer is sealed in this manner, the problems such as deterioration of the resin layer due to intrusion of the oil and decrease of rigidity due to overflow of the resin are unlikely to occur.

For example, a pair of the metal layers may be caulked and press-fitted to each other in the resin layer sealed parts, which are referred to as caulked parts. Moreover, the laminated body can be formed of vibration damping steel plates.

DETAILED DESCRIPTION OF PREFERRED EMBODIMENTS

Now, an embodiment of the Invention will be described referring to the drawings.

First Embodiment

Figure 1:
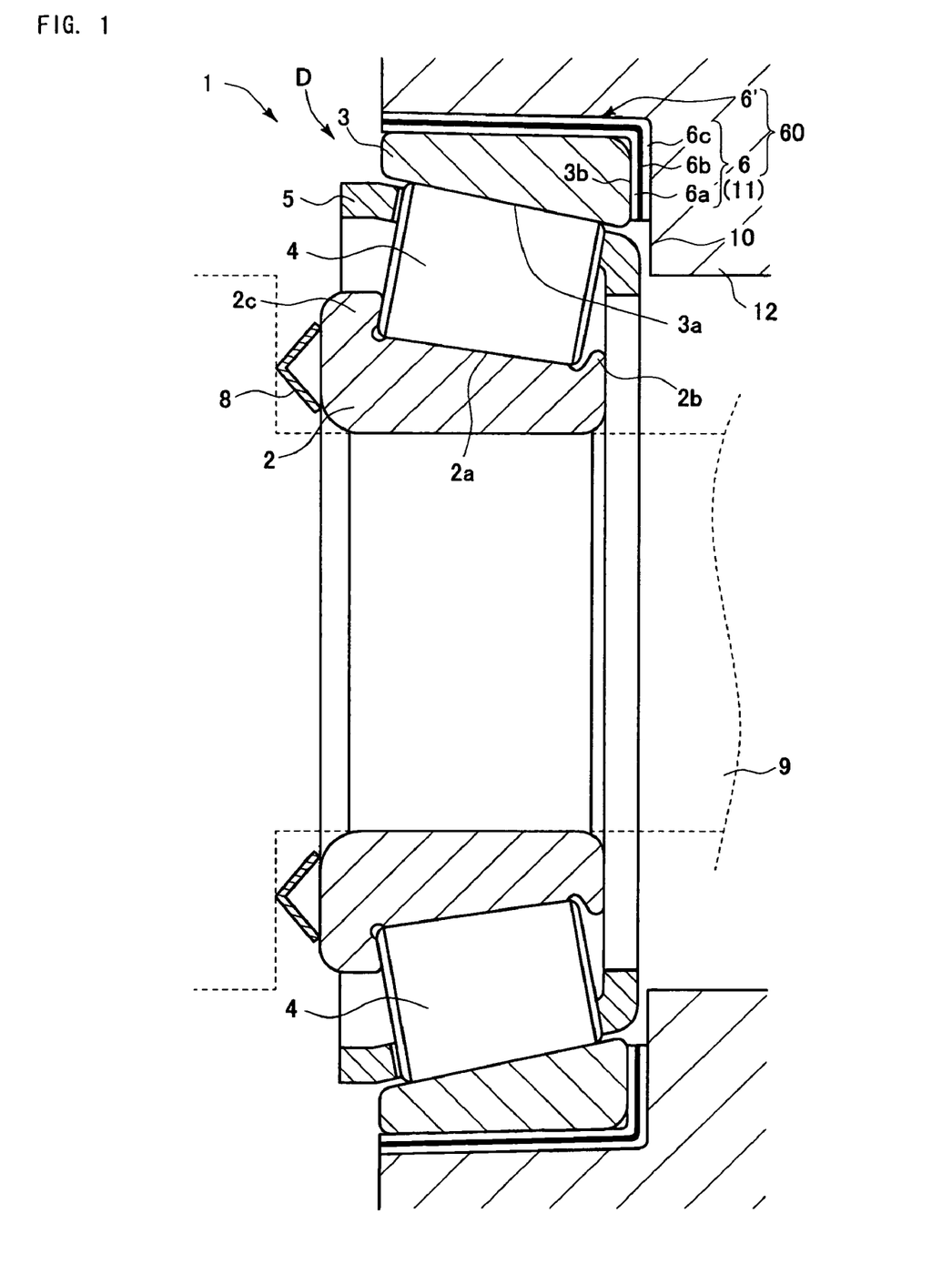
FIG. 1 is a longitudinal sectional view of a rolling bearing device according to the invention.
Figure 2:
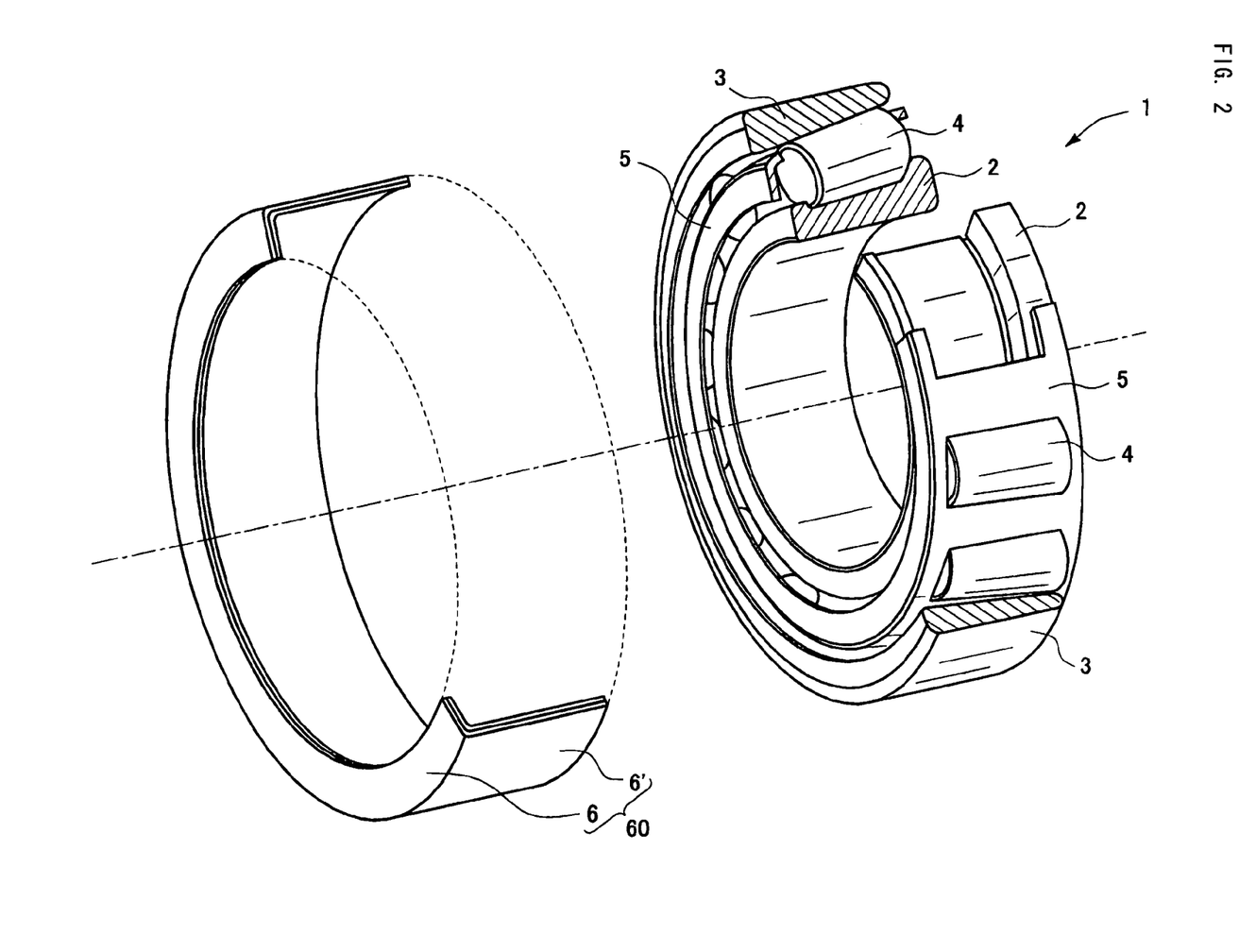
FIG. 2 is an exploded perspective view of the rolling bearing device.

FIG. 1 is a vertical sectional view of a rolling bearing device according to a first embodiment of the invention, and FIG. 2 is an exploded perspective view of the same. As shown in the drawings, a rolling bearing 1 includes an inner ring 2 which is provided with a raceway surface 2a for a rolling element 4 on its outer peripheral surface, and an outer ring 3 which is provided with a raceway surface 3a for the rolling element 4 on its inner peripheral surface. The outer ring 3 is arranged in a concave part D which is formed in a fixing member 12 such as a transmission case so as not to rotate in a state preloaded in an axial direction toward the inner ring 2 by way of the rolling element 4, with the fixing member 12 at a bottom surface 10 of the concave part D.

In this embodiment, the rolling bearing 1 which is used in a gear driven type transmitting unit, such as a transmission unit for an automobile is a taper roller bearing using a taper roller as the rolling element 4. The taper roller bearing has such advantages that it can be used with a large capacity though compact, and it is excellent in durability against impact load at a time of gear change. However, the taper roller bearing must be preloaded for restraining an axial gap, since a rolling surface of the roller is inclined. As shown in FIG. 1, an annular leaf spring 8 is provided on an end surface of the inner ring 2 in the axial direction. A certain preload is applied to the inner ring 2 by means of this leaf spring 8. As counteraction, the outer ring 3 is preloaded and urged in the axial direction toward the inner ring 2 with the fixing member 12, at the bottom surface 10 of the concave part D.

Figure 10:
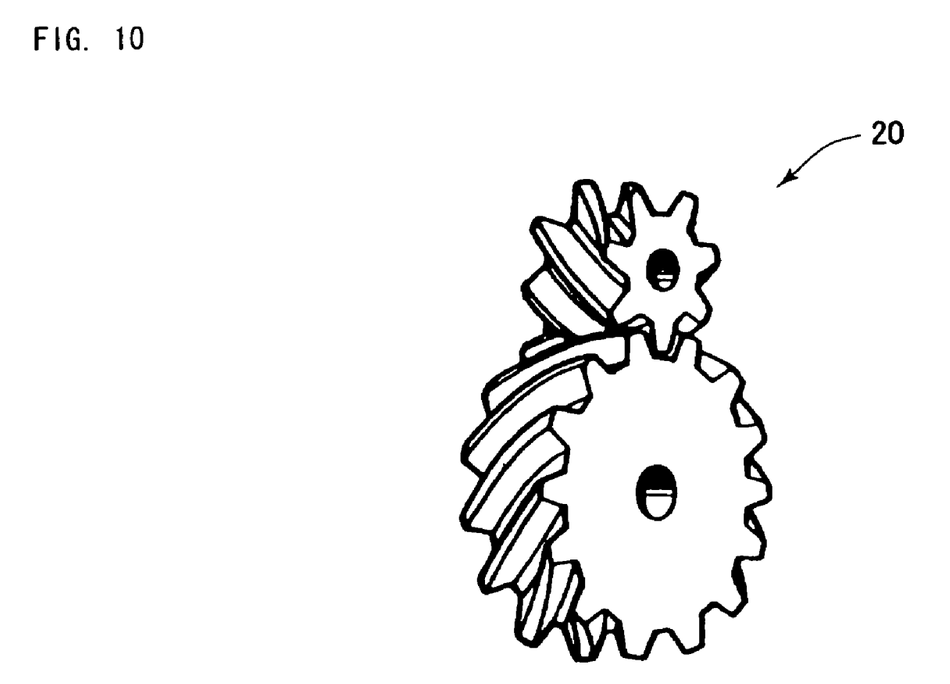
FIG. 10 is a perspective view of a helical gear.

A main rotation shaft 9 is fitted in the inner ring 2 to rotate the inner ring 2 together with this main rotation shaft 9. A gear 20 (for example, a helical gear: See FIG. 10) is attached to the main rotation shaft 9 so that the rotation driving power of the main rotation shaft 9 may be transmitted to the other shaft by way of the gear 20.

Figure 3:
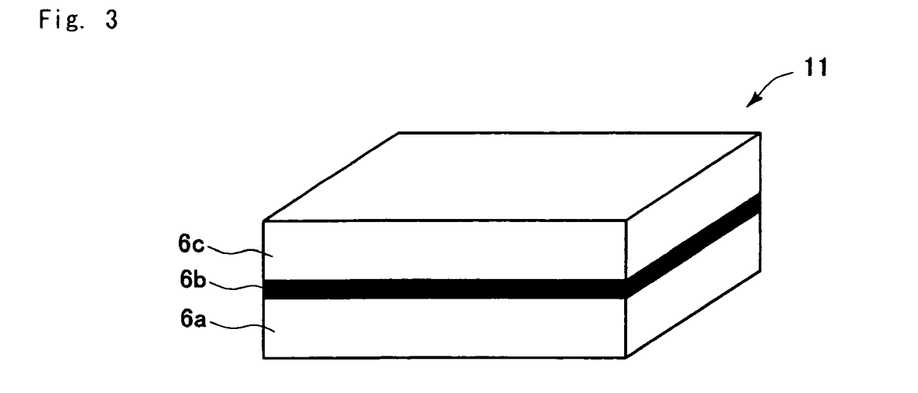
FIG. 3 is a perspective view of a laminated body which forms a vibration isolating sleeve.

When the main rotation shaft 9 rotates, the gear 20 is engaged, thereby generating vibration. This vibration is transmitted to the fixing member 12 through the main rotation shaft 9 and the bearing 1, causing gear noise to occur. As a countermeasure, according to this invention, a vibration isolating part 6 formed of a laminated body 11 including a pair of metal layers 6a, 6c and a resin layer 6b which is thinner than these metal layers 6a, 6c and interposed between them (See FIG. 3) is press clamped to be disposed between an end surface 3b of the outer ring 3 at a preloaded side and the bottom surface 10 of the concave part D, in such a manner that a direction of lamination may coincide with the axial direction. The laminated body 11 has high rigidity and excellent vibration absorbing performance, since it includes the metal layers 6a, 6c and the resin layer 6b.

Specifically, in case where the vibration isolating part 6 is completely formed of resin, it is excellent in vibration damping performance, but has low rigidity, which leads to a problem of deformation or so when used at high temperature. On the other hand, in case where the vibration isolating part 6 is completely formed of metal (for example, a vibration damping alloy such as Cu—Mn, Ni—Ti), it has high rigidity, but there is a problem that it is inferior in the vibration damping performance. However, by using the above described laminated body 11, it is possible to obtain the vibration isolating part 6 which is excellent in both the rigidity and the vibration damping performance. Moreover, because the thickness of the resin layer 6*b* is smaller than the thickness of the metal layers 6*a*, 6*c*, an amount of deformation when a pressure is applied can be depressed to least.

Figure 6:
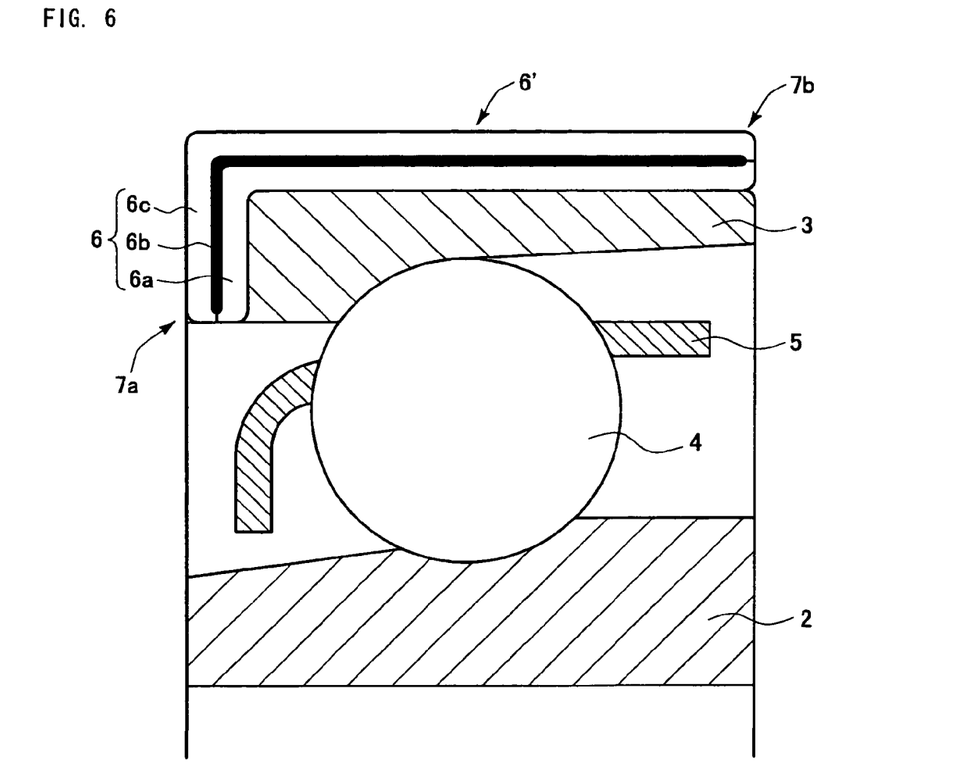
FIG. 6 is a longitudinal sectional view of an embodiment in which the rolling bearing device is applied to an angular ball bearing.

Moreover, because the outer ring 3 is preloaded as described above, the vibration isolating part 6 is used in a pressurized state. The vibration isolating part 6 in this invention is unlikely to be deformed even though pressurized, and particularly advantageous when used in the bearing which must be preloaded. Besides the taper roller bearing as shown in FIG. 1, an angular ball bearing as shown in FIG. 6 can be used as the bearing which must be preloaded.

In this embodiment, the thickness of both the metal layers 6*a*, 6*c* is about 0.8 mm, and the thickness of the resin layer 6*b* is about 0.05 mm. As steel material to be employed for the metal layers 6*a*, 6*c*, standard steel sheet (SS400) or stainless steel (SUS304) can be employed, and as resin material for the resin layer 6*b*, the resin which is known as vibration isolating resin, such as rubber group, polyethylene group, polyolefin group, polyisobutyl group, epoxy group can be employed. Particularly for the resin layer 6*c*, viscoelastic resin is preferably employed.

Reverting to FIG. 1, as shown in the drawing, in this embodiment, an auxiliary vibration isolating part 6' formed of a laminated body 11 including a pair of metal layers 6*a*, 6*c* and a resin layer 6*b* which is thinner than these metal layers 6*a*, 6*c* and interposed between them (See FIG. 3) is disposed between an outer peripheral surface of the outer ring 3 at a preloaded side and an inner peripheral surface of the concave part D in the fixing member 12, in such a manner that a direction of lamination may coincide with a radial direction of the outer ring 3. In this manner, it is possible to absorb the vibration transmitted from the end surface 3*b* of the outer ring 3 at the preloaded side in the axial direction, and at the same time, it is possible to decrease the vibration transmitted from the outer peripheral surface of the outer ring 3 to the fixing member 12.

Meanwhile, the outer ring 3 is press-fitted into the concave part D in the fixing member 12 interposing the auxiliary vibration isolating part 6'. Because the outer ring 3 is press-fitted into the concave part D, it is possible to firmly fix the outer ring 3. Even in case where the outer ring 3 is press-fitted, the amount of deformation is small, and a problem of axial contortion rarely occurs, because the auxiliary vibration isolating part 6' is formed of the aforesaid laminated body 11.

The helical gear (See FIG. 10) is preferably used as the gear 20. Because the helical gear is a gear of low noise, it is possible to further decrease the noises as a whole by providing the vibration isolating part 6 as in this invention, and to obtain a transmission which is particularly excellent in quietness. Moreover, in this invention, the auxiliary vibration isolating part 6' is unlikely to be deformed since it has high rigidity, and engaging accuracy of the helical gear can be easily secured.

As shown in FIG. 1, the vibration isolating part 6 and the auxiliary vibration isolating part 6' are coupled together in a form of a vibration isolating sleeve 60, in which the metal layer 6*a*, 6*c* and the resin layer 6*b* forming the vibration isolating part 6 is integrally coupled to the metal layers 6*a*, 6*c* and the resin layer 6*b* forming the auxiliary vibration isolating part 6', in an L-shape. By integrating the vibration isolating part 6 and the vibration isolating part 6' in this manner, they can be more easily assembled to the outer ring 3, as compared with a case in which they are provided as separate members.

Second Embodiment

Figure 4:
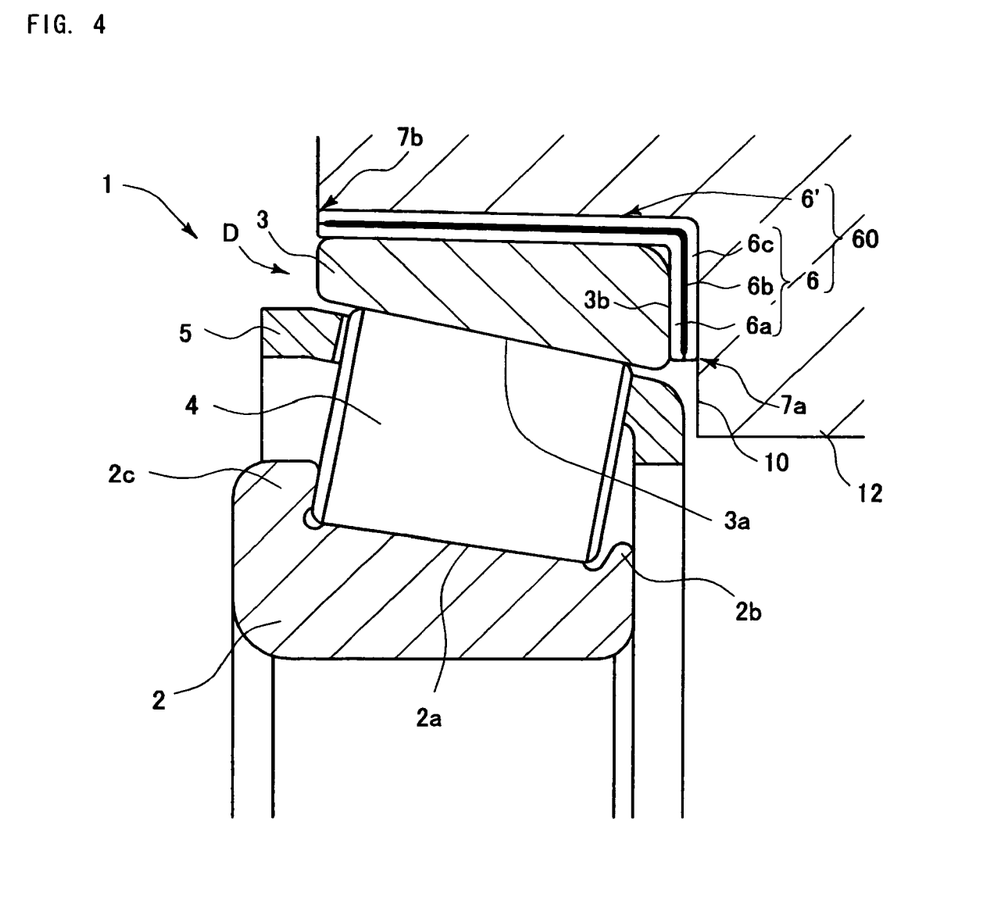
FIG. 4 is a longitudinal sectional view of an embodiment in which resin layer sealed parts are formed.
Figure 5:
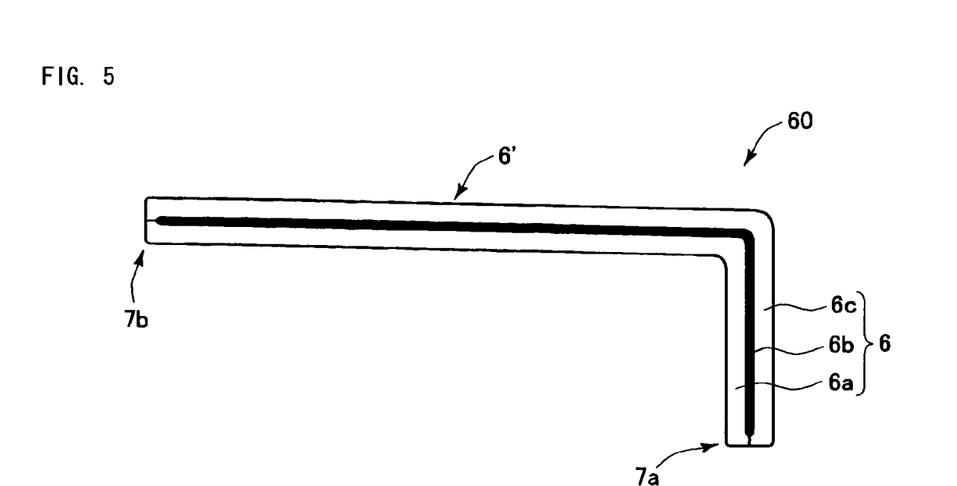
FIG. 5 is an enlarged longitudinal sectional view of the vibration isolating sleeve in FIG. 4.

Then, a second embodiment of the invention is shown in FIG. 4, and a longitudinal sectional view of the vibration isolating sleeve 60 in FIG. 4 is shown in an enlarged scale in FIG. 5. In this embodiment, resin layer sealed parts 7*a*, 7*b* in which, for the purpose of sealing the resin layer 6*b*, a pair of the metal layers 6*a*, 6*c* are directly brought into tight contact in a circumferential direction with each other at an inner peripheral edge of the vibration isolating part 6 in the radial direction, and at an end edge of the auxiliary vibration isolating part 6' in the axial direction at a side not connected to the vibration isolating part 6 are respectively provided. Because the resin layer 6*b* is sealed in this manner, the problems such as deterioration of the resin layer 6*b* due to intrusion of the oil and decrease of rigidity due to overflow of the resin are unlikely to occur. More specifically, a pair of the metal layers 6*a*, 6*c* are caulked and press-fitted to each other in the resin layer sealed parts 7*a*, 7*b*, which are referred to as caulked parts.

Figure 7:
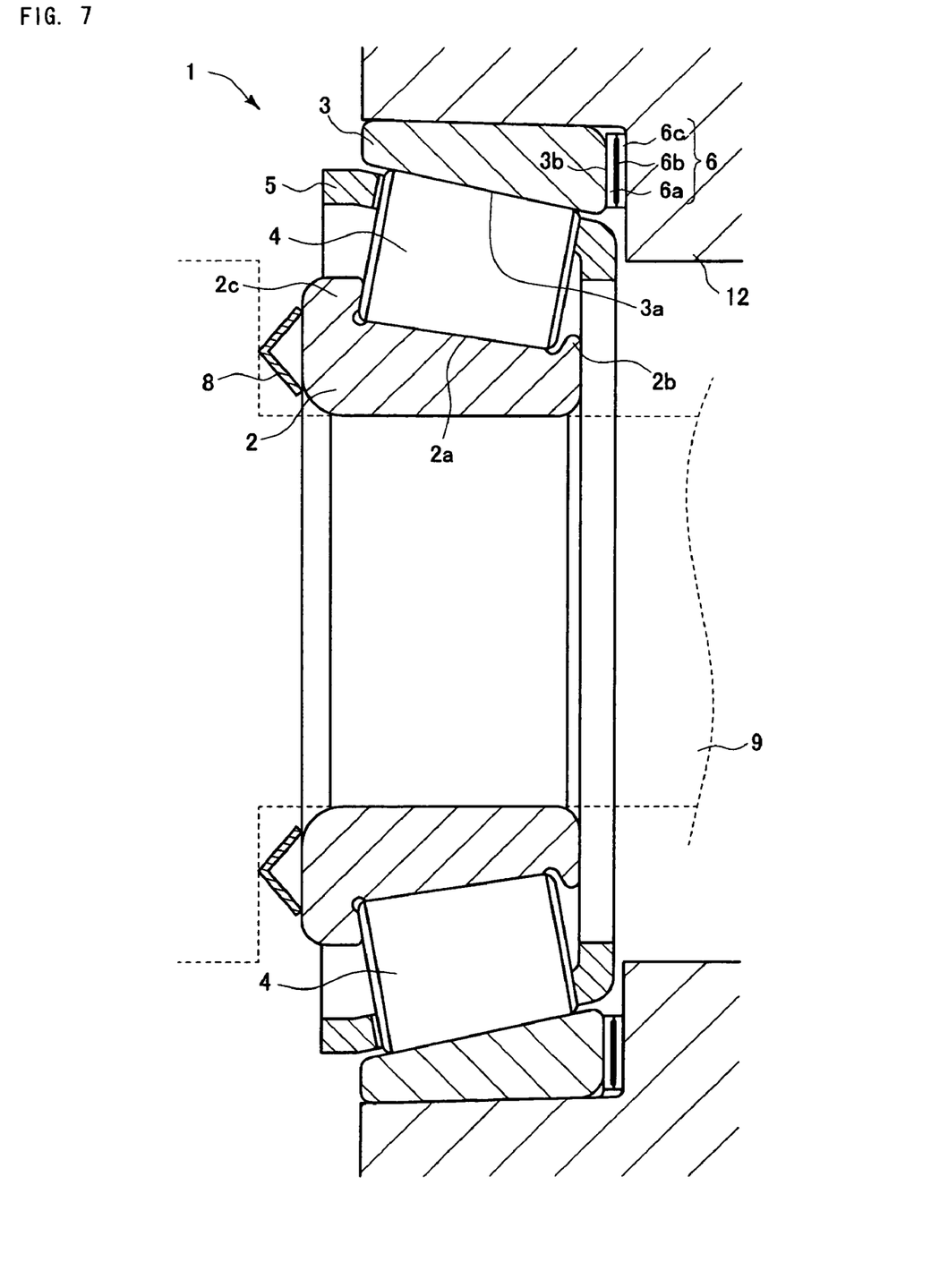
FIG. 7 is a longitudinal sectional view of an embodiment in which an auxiliary vibration isolating part is not provided.

Further, as shown in FIG. 7, it is possible to provide only the vibration isolating part 6, without providing the auxiliary vibration isolating part 6'.

Figure 8A:
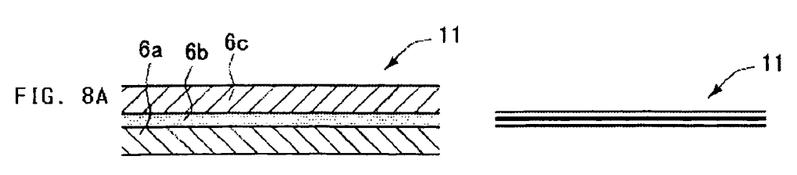
FIGS. 8A to 8D show a process chart for producing the vibration isolating sleeve.
Figure 8B:
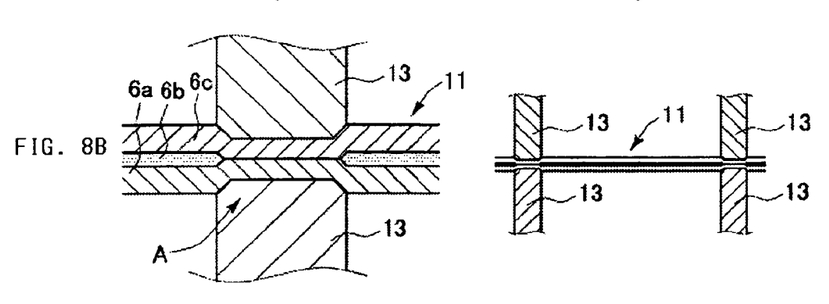

Then, referring to FIGS. 8A to 9C, a process for producing the vibration isolating sleeve 60 will be described. The vibration isolating sleeve 60 can be produced by drawing work, which will be described below. In FIGS. 8A to 8D, enlarged views are shown at a left side, and entire views are shown at a right side. As a first step, as shown in FIG. 8A, the laminated body 11 (a vibration damping steel plate) including a pair of the metal layers 6*a*, 6*c* and the resin layer 6*b* which is thinner than the metal layers 6*a*, 6*c* and interposed between them is prepared. Then, as shown in FIG. 8B, the laminated body 11 is caulked by a caulking tool 13 in a region A which will be the caulked part 7*b*, so that the metal layers 6*a*, 6*c* may be directly brought into tight contact with each other.

Figure 8C:
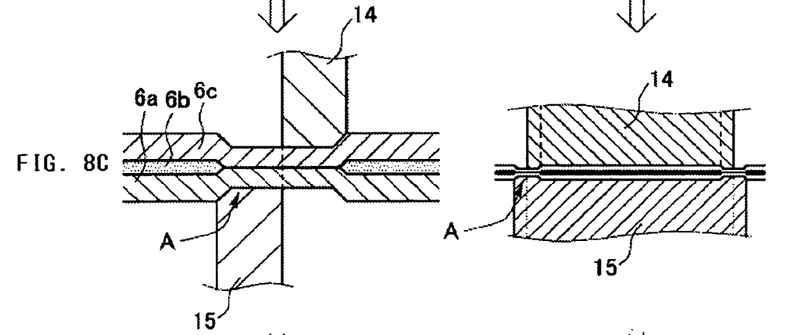
Figure 8D:
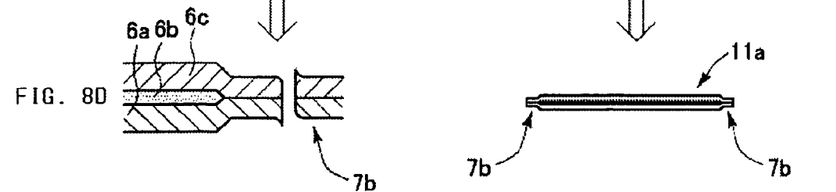

Then, as shown in FIGS. 8C and 8D, in the region A which will be the caulked part 7*b*, the laminated body 11 is sheared with a punch 14 and a die 15. In this manner, the laminated body 11 in a round shape is formed.

In the same manner, in the region which will be the caulked part 7*a*, the laminated body is caulked and sheared. The caulked parts 7*a*, 7*b* are formed in these steps, and the laminated body 11*b* in a ring-like shape in which the resin layer 6*b* is sealed between the metal layers 6*a*, 6*c* can be obtained.

Figure 9A:
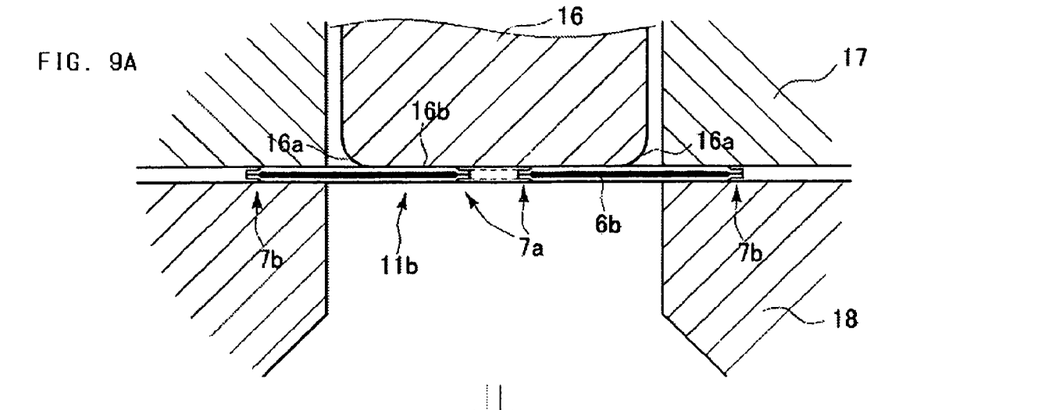
FIGS. 9A to 9C show a process chart continued from FIG. 8.
Figure 9B:
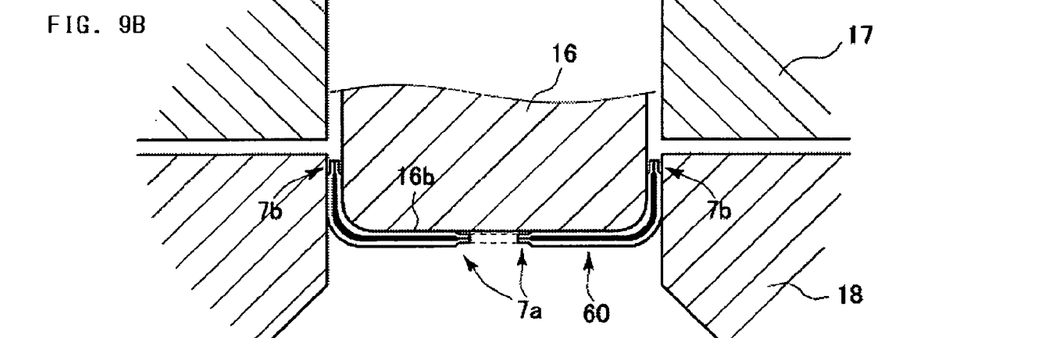

Thereafter, as shown in FIGS. 9A and 9B, the ring-like laminated body 11*b* is bent in the radial direction in such a manner that its inner peripheral edge portion may become the vibration isolating part 6, and its outer peripheral edge portion may become the auxiliary vibration isolating part 6'. Specifically, the inner peripheral edge portion of the ring-like laminated body 11*b* is pressed with a punch 16, while the outer peripheral edge portion of the ring-like laminated body 11*b* is clamped in a direction of thickness with a crimping plate 17 and a die 18. In this manner, the ring-like laminated body 11*b* is bent and deformed along a shoulder part 16*a* of the punch 16, whereby the vibration isolating sleeve 60 is formed.

Figure 9C:
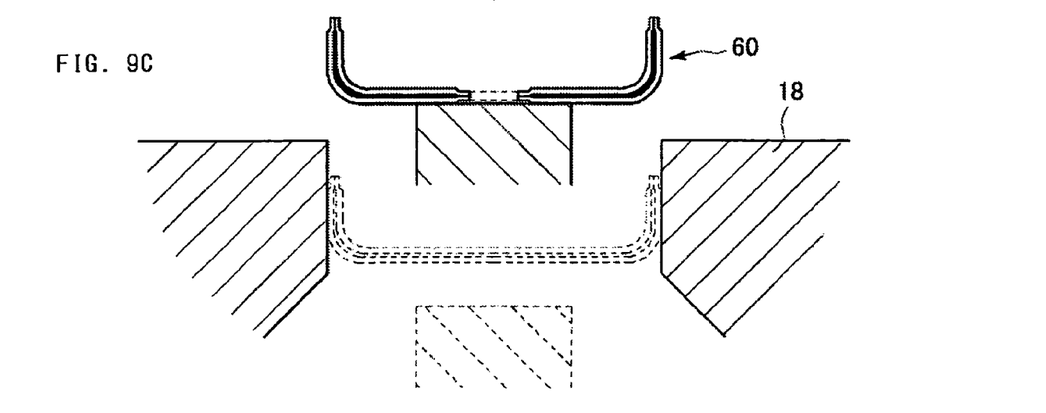

The punch 16 is formed in such a shape that its outer diameter becomes slightly smaller in a direction toward a bottom part 16*b*. Accordingly, when the punch 16 is pulled upward, the vibration isolating sleeve 60 is detached and remains in the die 18. Thereafter, the vibration isolating sleeve 60 is pushed out from an opposite side and taken out (FIG. 9C).

What is claimed is:

1. A rolling bearing device comprising:
   an inner ring including an outer peripheral raceway surface for a rolling element;
   an outer ring including an inner peripheral raceway surface for said rolling element, the outer ring being engaged with and fixed to a fixing member; and
   a vibration isolating member that includes a laminated body comprising a pair of metal layers and a resin layer interposed between the metal layers, the vibration isolating member being disposed between the fixing member and the outer ring, the pair of metal layers extending over distal end faces of the resin layer such that the pair of metal layers contact each other at the distal end faces of the resin layer,
   wherein the vibration isolating member includes a vibration isolating part which is press clamped between an end surface of the outer ring at a preloaded side in an axial direction and a bottom surface of a concave part formed in the fixing member, in such a manner that a direction of lamination coincides with the axial direction,
   wherein the vibration isolating member includes an auxiliary vibration isolating part which is arrant d between an inner peripheral surface of the concave part and an outer peripheral surface of the outer ring, in such a manner that the direction of lamination coincides with a radial direction of the outer ring,
   wherein the vibration isolating member is in a form of a vibration isolating sleeve in which the vibration isolating part including the pair of the metal layers and the resin layer is integrally coupled to the auxiliary vibration isolating part including the pair of the metal layers and the resin layer, in an L-shape, and
   wherein resin layer sealed parts in which a pair of said metal layers are directly brought into tight contact with each other for sealing the resin layer are respectively formed in a circumferential direction, at an inner peripheral edge part of the vibration isolating part in the radial direction and at an end edge part of the auxiliary vibration isolating part at a side not connected to said vibration isolating part in the axial direction.

2. The rolling bearing device according to claim 1, wherein the vibration isolating sleeve is formed by bending radially a ring-like laminated body including a pair of metal layers and a resin layer which is thinner than the metal layers and interposed between the metal layers, such that an inner peripheral, edge portion of the ring-like laminated body becomes the vibration isolating part, and an outer peripheral edge portion thereof becomes the auxiliary vibration isolating part.

3. The rolling bearing device according to claim 1, wherein the vibration isolating member is disposed such that the laminated body extends in the radial direction of the outer ring.

4. The rolling bearing device according to claim 1, wherein the vibration isolating member is sandwiched between the fixing member and the outer ring.

5. The rolling bearing device according to claim 1, wherein the vibration isolating member is disposed between a side face of the outer ring and the fixing member, the side face extending perpendicular to the axial direction.

6. The rolling bearing device according to claim 1, wherein the pair of metal layers is adhered to the resin layer.

7. The rolling bearing device according to claim 1, wherein the vibration isolating member is disposed so as to be under a compressive load from the outer ring and the fixing member.

8. The rolling bearing device according to claim 1, wherein the vibration isolating member comprises an L-shape, such that an end of the vibration isolating member extends parallel to the axial direction and another end of the vibration isolating member extends in the radial direction of the outer ring.

9. The rolling bearing device according to claim 1, wherein a distal end portion of a metal layer in the pair of metal layers contacts a distal end portion of another metal layer in the pair of metal layers.

10. The rolling bearing device according to claim 1, wherein the distal end faces of the resin layer are disposed at opposite ends of the resin layer.

11. The rolling bearing device according to claim 1, wherein the pair of metal layers are disposed on the resin layer so as to seal the resin layer from an area outside the pair of metal layers.

12. The rolling bearing device according to claim 1, wherein distal ends of the pair of metal layers, disposed on a distal end of the resin layer, contact each other so as to seal the distal end of the resin layer and other distal ends of the pair of metal layers, disposed on an other distal end of the resin layer, contact each other so as to seal the other distal end of the resin layer.

* * * * *